(12) United States Patent  
Huang

(10) Patent No.: US 9,116,294 B2  
(45) Date of Patent: Aug. 25, 2015

(54) WAVEGUIDE LENS FOR COUPLING LASER LIGHT SOURCE AND OPTICAL ELEMENT

(71) Applicant: HON HAI PRECISION INDUSTRY CO., LTD., New Taipei (TW)

(72) Inventor: Hsin-Shun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 13/962,969

(22) Filed: Aug. 9, 2013

(65) Prior Publication Data

US 2014/0185985 A1 Jul. 3, 2014

(30) Foreign Application Priority Data

Dec. 27, 2012 (TW) .............................. 101150697 A

(51) Int. Cl.
*G02B 6/32* (2006.01)
*G02B 6/124* (2006.01)
*G02B 6/12* (2006.01)

(52) U.S. Cl.
CPC ............ *G02B 6/124* (2013.01); *G02B 6/12004* (2013.01)

(58) Field of Classification Search
CPC ..................................... G02B 6/32; G02B 6/00
USPC ...................................................... 385/32, 40
See application file for complete search history.

(56) References Cited

U.S. PATENT DOCUMENTS

| | | | | | |
|---|---|---|---|---|---|
| 4,491,384 | A | * | 1/1985 | Yamashita et al. ................. | 385/7 |
| 4,737,946 | A | * | 4/1988 | Yamashita et al. ......... | 369/44.12 |
| 5,070,488 | A | * | 12/1991 | Fukushima et al. ....... | 369/44.12 |
| 5,138,687 | A | * | 8/1992 | Horie et al. .................... | 385/129 |
| 5,195,070 | A | * | 3/1993 | Shiba et al. ................. | 369/44.12 |
| 5,276,743 | A | * | 1/1994 | Penner et al. .................... | 385/14 |
| 5,619,369 | A | * | 4/1997 | Yamamoto et al. ........... | 359/332 |
| 5,835,472 | A | * | 11/1998 | Horie et al. .............. | 369/110.02 |
| 5,917,980 | A | * | 6/1999 | Yoshimura et al. ........... | 385/129 |
| 5,937,120 | A | * | 8/1999 | Higashi ............................ | 385/49 |
| 6,307,996 | B1 | * | 10/2001 | Nashimoto et al. ........... | 385/130 |
| 6,385,355 | B1 | * | 5/2002 | Nashimoto et al. ............... | 385/8 |
| 2010/0092128 | A1 | * | 4/2010 | Okayama ........................ | 385/14 |
| 2014/0185985 | A1 | * | 7/2014 | Huang ............................. | 385/33 |

* cited by examiner

*Primary Examiner* — Kaveh Kianni  
(74) *Attorney, Agent, or Firm* — Novak Druce Connolly Bove + Quigg LLP

(57) ABSTRACT

A waveguide lens includes a substrate, a planar waveguide, a media grating, and a pair of electrode. The planar waveguide is formed on the substrate and configured to couple with a laser light source that emits a laser beam into the planar waveguide along an optical axis. The media grating is formed on the planar waveguide and arranged symmetrically about a widthwise central axis that is collinear with the optical axis. The electrodes are formed on the substrate, positioned at two opposite sides of the waveguide lens, and arranged symmetrically about the optical axis.

11 Claims, 3 Drawing Sheets

WAVEGUIDE LENS FOR COUPLING LASER LIGHT SOURCE AND OPTICAL ELEMENT

BACKGROUND

1. Technical Field

The present disclosure relates to integrated optics and, particularly, to a waveguide lens for coupling a laser light source and an optical element.

2. Description of Related Art

Lasers are used as light sources in integrated optics as the lasers have excellent directionality, as compared to other light sources. However, laser beams emitted by the lasers still have a divergence angle. As such, if the laser is directly connected to an optical element, divergent rays may not be able to enter into the optical element, decreasing light usage.

Therefore, it is desirable to provide a waveguide lens, which can overcome the above-mentioned problem.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will be described with reference to the drawings.

Figure 1:
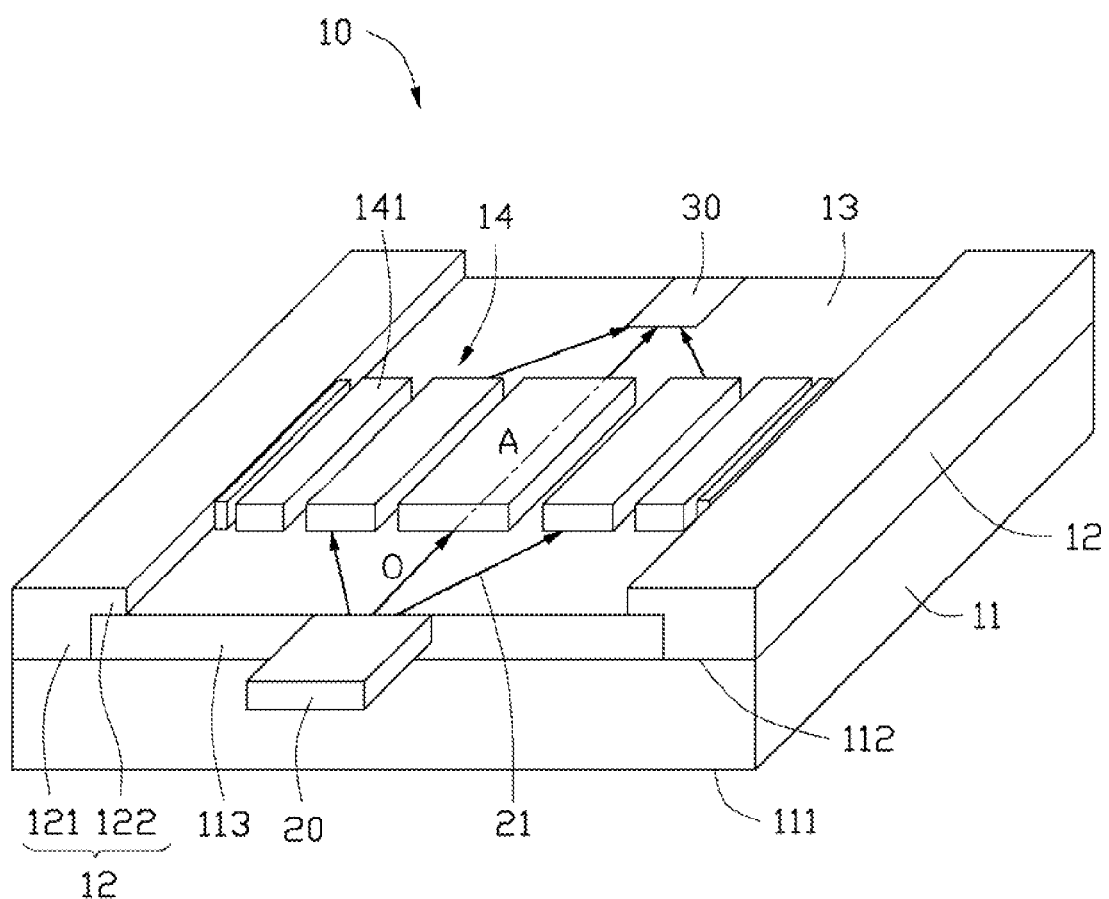
FIG. 1 is an isometric schematic view of a waveguide lens, according to an embodiment.
Figure 2:
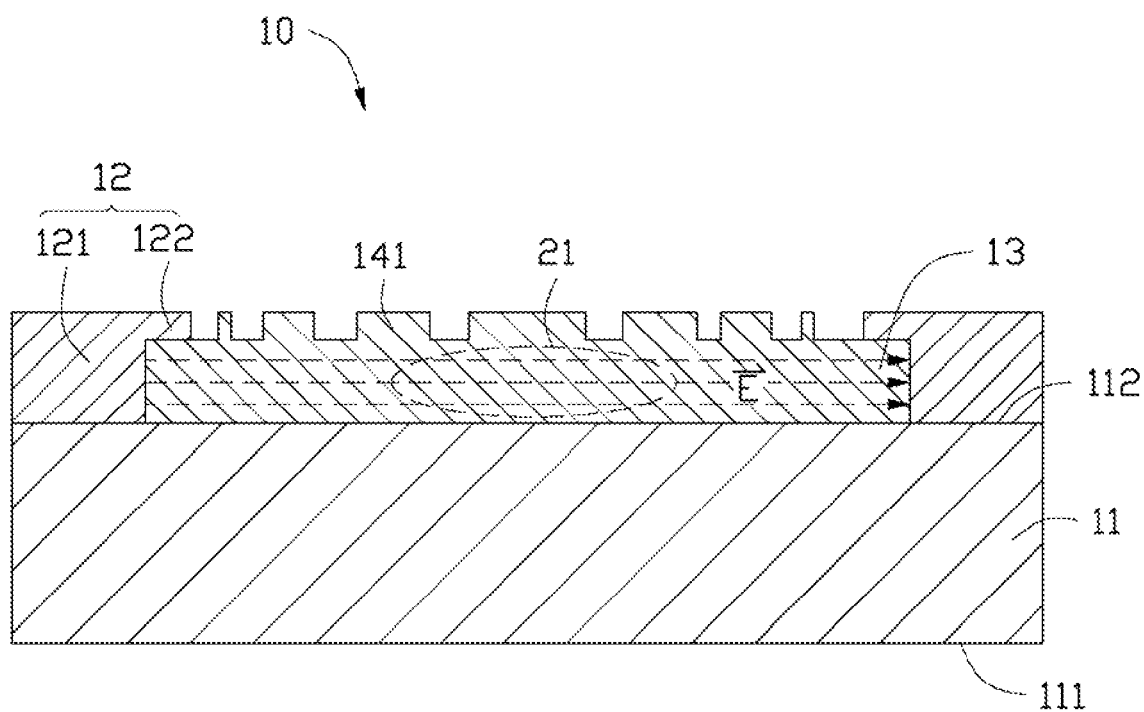
FIG. 2 is a cross-sectional view taken along a line II-II of FIG. 1.

FIGS. 1 and 2 show an embodiment of a waveguide lens 10. The waveguide lens 10 includes a substrate 11, a planar waveguide 13 formed on the substrate 11, and a media grating 14 formed on the planar waveguide 13.

The substrate 11 is substantially rectangular and includes a bottom surface 111 and a top surface 112 opposite to the bottom surface 111. In this embodiment, the substrate 11 is made of lithium niobate.

The planar waveguide 13 is formed on the top surface 112 and can be made of suitable semiconductor materials such as silicon and dioxide silicon by, for examples, coating. An effective refractive index of the planar waveguide gradually changes when a media is loaded.

The planar waveguide 13 is also rectangular and includes a side surface 113. The side surface 113 is perpendicular to the top surface 112 and is configured to couple with a laser light source 20. The laser light source 20 emits a laser beam 21 having a divergent angle into the planar waveguide 13 substantially along an optical axis O. The axis O is substantially perpendicular to the side surface 113. The laser light source 20 is a distributed feedback laser, and is attached to a portion of the side surface 113 corresponding to the planar waveguide 13 by, for example, a die bond technology.

A length of the waveguide 13, measured along a direction parallel with the optical axis O, is substantially equal to and aligned with a length of the substrate 11. A width of the waveguide 13, measured along a direction that is perpendicular to the optical axis O and parallel with the sidewall 113, is shorter than and centered at a width of the substrate 11.

However, the substrate 11 and the planar waveguide 13 are not limited to this embodiment but can be changed as needed. For example, in other embodiments, the substrate 11 can be made of ceramic or plastic and the planar waveguide 13 can be made of lithium niobate diffused with titanium.

The media grating 14 is formed by coating high-refractive material, such as dioxide silicon, dioxide silicon doped with boson or phosphorus, and organic compounds on the planar waveguide 13 by, for example, sputtering, and cutting the high-refractive material using, for example, a photolithography technology, to form the media grating 14. The media grating 14 is smaller than the planar waveguide 13 in length and width and is centered on the planar waveguide 13.

However, the media grating 14 is not limited to this embodiment. In other embodiments, the media grating 14 can also be made of lithium niobate diffused with titanium and is formed by etching an upper part of the waveguide plate 13.

The media grating 14 can be a chirped grating and has an odd number of media strips 141. The media strips 141 are symmetrical about a widthwise central axis A of the media grating 14. The central axis A and the optical axis O are collinear. Each of the media strips 141 is rectangular and parallel with each other. In order from the widthwise central axis A to each side, widths of the media strips 141 decrease, and widths of gaps between each two adjacent media strips 141 also decrease.

Figure 3:
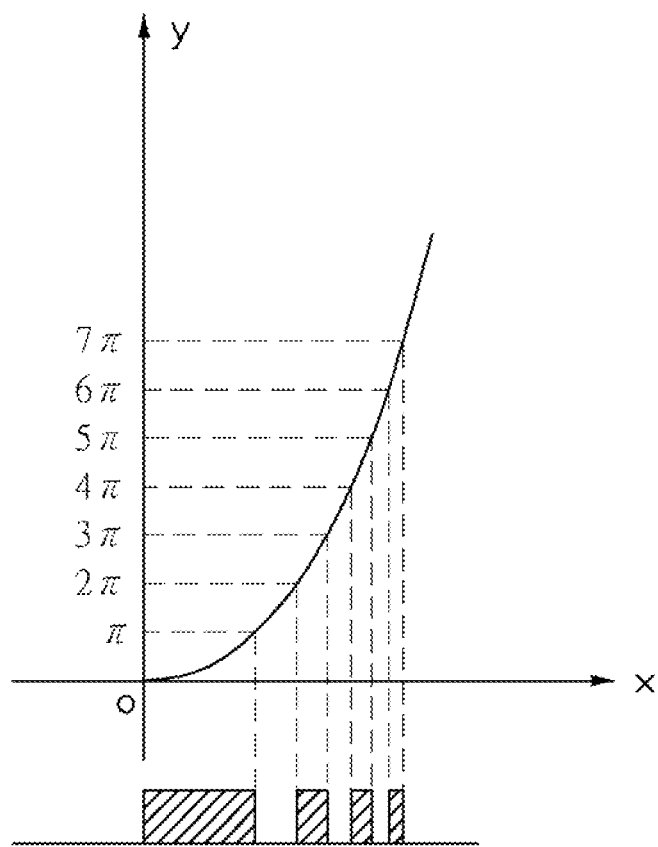
FIG. 3 is a schematic view of a first media grating of the waveguide lens of FIG. 1.

FIG. 3 shows that a coordinate system "oxy" is established, wherein the origin "o" is an intersecting point of the widthwise central axis A and a widthwise direction of the planar waveguide 13, "x" axis is the widthwise direction of the planar waveguide 13, and "y" axis is a phase shift of the laser beam 21 at a point "x". According to wave theory of planar waveguides, $y=a(1-e^{kx^2})$, wherein x>0, a, e, and k are constants. In this embodiment, boundaries of the media strips 141 are set to conform to conditions of formulae:

$$y_n = a\left(1 - e^{kx_n^2}\right)$$

and $y_n = n\pi$, wherein $x_n$ is the nth boundary of the media strips 141 along the "x" axis, and $y_n$ is the corresponding phase shift. That is, $$x_n = \sqrt{\frac{\ln\left(1 - \frac{n\pi}{a}\right)}{k}} \quad (x_n > 0).$$

The boundaries of the media strips 141 where $x_n<0$ can be determined by characteristics of symmetry of the media grating 14.

The optical element 30 can be a strip waveguide, an optical fiber, or a splitter.

In operation, the media grating 14 and the planar waveguide 13 constitute a diffractive waveguide lens to converge the divergent laser beam 21 into the optical element 30. As such, usage of the laser beam 21 is increased.

In particular, the waveguide lens 10 further includes a pair of electrodes 12.

The pair of first electrodes 12 is are formed on the substrate 11, positioned at two opposite sides of the planar waveguide 13, and are arranged substantially symmetrical about the optical axis O. Each electrode 12 is as high as or higher than the planar waveguide 13. In this embodiment, each electrode 12 includes a first portion 121 and a second portion 122, both of which are substantially rectangular. The first portion 121 is attached to the top surface 112 and a sidewall of the planar waveguide 13. A height of the first portion 121 is substantially equal to a total height of the planar waveguide 13 and the media grating 14. A length of the first portion 121 is as long as the planar waveguide 13. The second portion 122 extends from a sidewall of the first portion 121 that is attached to the planar waveguide 13 and covers a part of the planar waveguide 13. A height of the second portion 122 is substantially equal to the media grating 14, and a length of the second portion is as long as a length of the planar waveguide 13.

As such, an electric field $\vec{E}$ generated between the electrodes 12 can effectively change effective refractive index of the planar waveguide 13 and thus change effective focal length of the waveguide lens 10.

It will be understood that the above particular embodiments are shown and described by way of illustration only. The principles and the features of the present disclosure may be employed in various and numerous embodiments thereof without departing from the scope of the disclosure. The above-described embodiments illustrate the possible scope of the disclosure but do not restrict the scope of the disclosure.

What is claimed is:

1. A waveguide lens, comprising:
a substrate having a bottom surface and a top surface opposite to the bottom surface;
a planar waveguide being substantially rectangular and comprising a lower surface located on the top surface, an upper surface opposite to the lower surface, a first sidewall perpendicular to the top surface and the lower surface, two second sidewalls opposite to each other and perpendicularly interconnected between the lower surface and the upper surface, the first sidewall configured to couple with a laser light source, the laser light source being configured to emit a laser beam into the planar waveguide along an optical axis that is perpendicular to the first sidewall;
a media grating formed on the planar waveguide and being symmetrical about a widthwise central axis of the media grating that is collinear with the optical axis; and
two electrodes formed on the top surface, positioned at two opposite sides of the waveguide lens, and arranged symmetrically about the optical axis, each electrode having a substantially L-shaped cross section along the direction of the first sidewall, the two electrodes facing each other and being spaced apart from each other, the two electrodes and the top surface of the substrate cooperatively forming a receiving room having a first opening and a second opening, the planar waveguide received in the receiving room, the first sidewall being exposed at the first opening, the upper surface being exposed at the second opening, and the two second sidewalls facing the two electrodes and entire shielded by the two electrodes.

2. The waveguide lens of claim 1, wherein the substrate is made of ceramic.

3. The waveguide lens of claim 1, wherein the planar waveguide is made of lithium niobate diffused with titanium.

4. The waveguide lens of claim 1, wherein the media grating is made of a material selected from the group consisting of lithium niobate diffused with titanium, dioxide silicon, dioxide silicon doped with boson, dioxide silicon doped with phosphorus, and organic compounds.

5. The waveguide lens of claim 1, wherein the media grating is a chirped grating.

6. The waveguide lens of claim 1, wherein the media grating comprises an odd number of media strips extending along a direction that is substantially parallel with the widthwise central axis, each of the media strips is rectangular, in this order from the widthwise central axis to each widthwise side of the media grating, widths of the media strips decrease, and widths of gaps between each two adjacent media strips also decrease.

7. The waveguide lens of claim 6, wherein a coordinate axis "ox" is established, wherein the origin "o" is an intersecting point of the widthwise central axis and a widthwise direction of the planar waveguide, and "x" axis is the widthwise direction of the planar waveguide, boundaries of the media strips are set to conform condition formulae:

$$x_n = \sqrt{\frac{\ln\left(1 - \frac{n\pi}{a}\right)}{k}},$$

and $x_n > 0$, wherein $x_n$ is the nth boundary of the media strips along the "x" axis, and a and k are constants.

8. The waveguide lens of claim 1, wherein each electrode is higher than and as long as the planar waveguide.

9. The waveguide lens of claim 1, wherein the planar waveguide further comprises a third sidewall opposite to the first sidewall, the receiving room has a third opening, and the third sidewall is exposed at the third opening.

10. The waveguide lens of claim 1, wherein each electrode comprises a first portion and a second portion, both of which are substantially rectangular, the first portion is attached to the top surface and the second sidewall, and the second portion extends from a sidewall of the first portion that is attached to the planar waveguide and contacts a part of the upper surface.

11. The waveguide lens of claim 10, wherein a height of the first portion is substantially equal to a total height of the planar waveguide and the media grating, a length of the first portion is as long as the planar waveguide, a height of the second portion is substantially equal to the media grating, and a length of the second portion is as long as a length of the planar waveguide.

* * * * *